(12) United States Patent
Zhou et al.

(10) Patent No.: US 9,967,269 B2
(45) Date of Patent: May 8, 2018

(54) METHOD, DEVICE AND SYSTEM FOR PROCESSING DNS BEHAVIOR

(71) Applicant: BEIJING QIHOO TECHNOLOGY COMPANY LIMITED, Beijing (CN)

(72) Inventors: Hongyi Zhou, Beijing (CN); Can Pu, Beijing (CN); Xiaosheng Tan, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 0 days. days.

(21) Appl. No.: 15/301,938

(22) PCT Filed: Mar. 19, 2015

(86) PCT No.: PCT/CN2015/074612
§ 371 (c)(1),
(2) Date: Oct. 4, 2016

(87) PCT Pub. No.: WO2015/149629
PCT Pub. Date: Oct. 8, 2015

(65) Prior Publication Data
US 2017/0118232 A1    Apr. 27, 2017

(30) Foreign Application Priority Data
Apr. 4, 2014 (CN) .......................... 2014 1 0136257

(51) Int. Cl.
*H04L 29/06* (2006.01)
*H04L 29/12* (2006.01)

(52) U.S. Cl.
CPC ...... *H04L 63/1416* (2013.01); *H04L 61/1511* (2013.01); *H04L 63/0245* (2013.01); *H04L 63/1441* (2013.01); *H04L 63/1458* (2013.01)

(58) Field of Classification Search
CPC .................................................. H04L 63/1416
See application file for complete search history.

(56) References Cited

U.S. PATENT DOCUMENTS 7,296,155 B1 * 11/2007 Trostle ............... H04L 63/1441
            713/170
2001/0049741 A1 * 12/2001 Skene .................... G06F 9/505
            709/232

(Continued)

FOREIGN PATENT DOCUMENTS

CN    102325010 A    1/2012
CN    102790809 A    11/2012

(Continued)

OTHER PUBLICATIONS

International Patent Application No. PCT/CN2015/074612; Int'l Search Report and the Written Opinion; dated Jun. 29, 2015; 4 pages.

*Primary Examiner* — Morshed Mehedi
(74) *Attorney, Agent, or Firm* — Baker & Hostetler LLP

(57) ABSTRACT

The invention provides a method, device and system for processing DNS behavior. The method comprises: resolving received network data packet; judging a DNS behavior type corresponding to the network data packet according to the resolution result; determining a processing body according to the DNS behavior type, wherein the processing body comprises a kernel and/or an application layer; and transferring the network data packet to the determined processing body, and processing the network data packet by the determined processing body. The method in the disclosure can improve the DNS defense capability, while improving the service processing capability of a single machine.

13 Claims, 4 Drawing Sheets

(56) References Cited

U.S. PATENT DOCUMENTS

| | | | |
|---|---|---|---|
| 2008/0235507 A1* | 9/2008 | Ishikawa | H04L 63/0428 713/150 |
| 2011/0153807 A1* | 6/2011 | Vicisano | H04L 29/12066 709/224 |
| 2014/0101758 A1* | 4/2014 | Ludin | H04L 47/70 726/22 |
| 2014/0181972 A1* | 6/2014 | Karta | H04L 63/1425 726/23 |

FOREIGN PATENT DOCUMENTS

| | | |
|---|---|---|
| CN | 103327025 A | 9/2013 |
| CN | 103957284 A | 7/2014 |

\* cited by examiner

METHOD, DEVICE AND SYSTEM FOR PROCESSING DNS BEHAVIOR

CROSS-REFERENCE TO RELATED APPLICATIONS

This application is the national stage of International Application No. PCT/CN2015/074612 filed Mar. 19, 2015, which is based upon and claims priority to Chinese Patent Applications No. CN201410136257.X, filed Apr. 4, 2014, the entire contents of which are incorporated herein by reference.

FIELD OF TECHNOLOGY

The disclosure relates the field of DNS protection, and in particular to a method, device and system for processing DNS behavior.

BACKGROUND

DNS (Domain Name System) is a distributed database which allows for a local control on each part of entire database while data of each part can be visited by way of client-server in an entire network. With backup and caching mechanisms, DNS will have a strong and adequate performance.

Currently, software systems providing DNS resolution are generally BIND, modified BIND version, NSD and POWERDNS, for example. These kinds of software can achieve a certain resistance to attack for example by ANYCAST load balancing.

However, DNS is based on UDP (User Datagram Protocol), which can be attacked by requests that are easily generated by simulation. With development of system and increasing improvement of hardware, a single machine may transfer significantly improved UDP pockets, and thus it is easy to transfer millions of DNS request attacks per second by a few machines.

In addition to structural anomaly data attacks, current attack programs may also construct request attacks which completely the same as normal data initiated by a user. At the same time, DNS response performance is particularly important. While DNS defense capability is improved, it is necessary to improve service processing capability of a single machine.

SUMMARY

In the view of above problems, the disclosure is proposed to provide a method, device and system for processing DNS behavior to overcome or at least partially resolve above problems.

According to one aspect of the disclosure, there is provided a method for processing DNS behavior in an embodiment of the disclosure, comprising steps of:

resolving received network data packet;

judging a DNS behavior type corresponding to the network data packet according to the resolution result;

determining a processing body according to the DNS behavior type, wherein the processing body comprises a kernel and/or an application layer; and transferring the network data packet to the determined processing body, and processing the network data packet by the determined processing body.

According to another aspect of the disclosure, there is provided a device for processing DNS behavior in an embodiment of the disclosure, comprising:

a resolution module, configured to resolve received network data packet;

a judging module, configured to judge a DNS behavior type corresponding to the network data packet according to the resolution result;

a determining module, configured to determine a processing body according to the DNS behavior type, wherein the processing body comprises a kernel and/or application layer; and a processing module, configured to transfer the network data packet to the determined processing body to process the network data packet by the determined processing body.

According to still another aspect of the disclosure, there is provided a system for processing DNS behavior in an embodiment of the disclosure, including the device for processing DNS behavior as described above, further comprising:

a processing body, including a kernel and/or an application layer and configured to invoke different processing bodies to process the network data packet according to the DNS behavior type of the network data packet.

According to still another aspect of the disclosure, there is provided a DNS domain name resolution system in an embodiment of the disclosure, including the device for processing DNS behavior according to any one of above aspects, a client-side and a domain name resolution apparatus, wherein the client-side, configured to send network data packet;

the device for processing DNS behavior, configured to resolve received network data packet, judge a DNS behavior type corresponding to the network data packet according to the resolution result, determine a processing body according to the DNS behavior type, wherein the processing body comprises a kernel and/or application layer, and transfer the network data packet to the determined processing body to process the network data packet by the determined processing body; and the domain name resolution apparatus, configured to resolve a domain name of the network data packet according to the DNS behavior type.

According to still another aspect of the disclosure, there is provided a DNS domain name resolution system in an embodiment of the disclosure, including the device for processing DNS behavior as described above, a client-side and a domain name resolution apparatus, wherein the client-side, configured to send network data packet;

the device for processing DNS behavior, configured to resolve received network data packet, judge a DNS behavior type corresponding to the network data packet according to the resolution result, determine a processing body according to the DNS behavior type, wherein the processing body comprises a kernel and/or application layer, and transfer the network data packet to the determined processing body to process the network data packet by the determined processing body; and the domain name resolution apparatus, configured to resolve a domain name of the network data packet according to the DNS behavior type.

According to still another aspect of the disclosure, there is provided a computer program, including computer readable codes, wherein the method for processing DNS behavior according to any one of aspects is executed by a computing device when the computer readable codes are operated on the computing device.

According to still another aspect of the disclosure, there is provided a computer readable medium, in which the computer program as described above is stored.

Beneficial effects of the disclosure are as below.

In this embodiment of the disclosure, for each of received network data packet, the DNS behavior type corresponding to the network data packet may be judged and the processing body that can process the network data packet may be determined according to the determined DNS behavior type, so as to transfer the network data packet to the determined processing body for processing. In this embodiment of the disclosure, the processing body may be formed of two layers which are a kernel layer and an application layer, respectively. The kernel layer may include a network layer and a driver layer, for example, which can achieve the caching and the protection against attacks; the application layer may provide basic resolution to the network data packet, including address after the domain name resolution and acquisition of data memory address, for example. Compared to the method for processing DNS behavior in the prior art, the network data packet can be transferred to the kernel layer and the application layer for processing, respectively, such that a DNS request can be processed according to the actual request. In the case of millions of DNS request attacks per second, the kernel having a stronger processing capacity can be used to process them; in the case of a DNS request having a lower time-based requirement, the application layer can be used to process them. The kernel layer and the application layer are used to process the DNS request, respectively, in consideration of the kernel having a remarkable processing capacity which can complete the mass-flow DNS queries. Further, when the modification or the starting caused by the DNS request results in loading, one of the kernel layer and the application layer may be used to process the current DNS request while the other one may continue to provide the external services due to respective processes of the kernel layer and the application layer. Therefore, the embodiment of the disclosure can improve the service processing capability of a single machine, achieving rapid dynamic management of domain name and configuration while significantly increasing processing capacity and security defense capability of the system. Therefore, a plenty of customized complex functional requirements can be realized.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to a person having ordinary skill in the art. Accompanying drawings are included merely for the purpose of illustrating the preferred embodiments and should not be considered as limiting of the invention. Further, throughout the drawings, same elements are indicated by same reference numerals.

DESCRIPTION OF THE EMBODIMENTS

The disclosure will be further described in detail in conjunction with accompanying figures and specific embodiments.

Currently, commonly used DNS software includes database based DNS software (for example, MYDNS) and BIND. Software inquiry of the database based DNS software (for example, MYDNS) is based on database or main memory database, allowing for prompt dynamic data updating and convenient management. However, in this DNS processing manner, each inquiry would require a database query. Since there is a bottle-neck in connection with the performance of database query, it is difficult to achieve a DNS query with mass flow. query In addition, the BIND is a relatively widely used DNS system at present. Records thereof are all loaded into memory, such that no input/output (I/O) of file occurs in the query. Ten thousands of queries can be processed per second, which is very stable. However, the BIND obtains data from a text file so that problems may easily take place due to edit errors. Every time a domain name is modified, the domain name is necessarily re-loaded to the memory while a configuration file of the BIND (the configuration file for an amount of 300,000 domain names would have a size of approximately 2M) is necessarily re-read by an added domain name. Therefore, starting time and time of taking effect could not be as fast as the database manner. Further, when a loading is caused by modification or starting, external services could not be provided.

From above analysis, it shows that the DNS processing manner in the prior art requires millions of DNS queries per second. Then it is necessary to reduce all I/O and memory copy operations, resulting in a degraded performance.

Further, as an authorized DNS, a user needs to modify DNS records frequently. In the modification, other functions cannot be affected and normal services could be provided.

Figure 1:
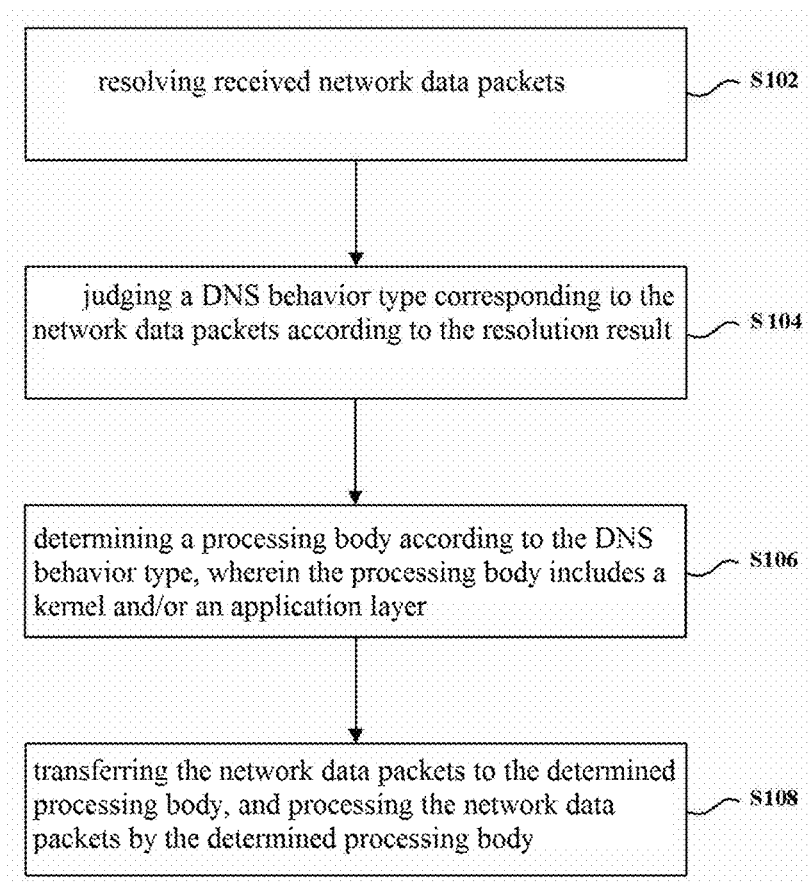
FIG. 1 illustrates a flowchart of a method for processing DNS behavior according to an embodiment of the disclosure.

Therefore, based on above analysis and in order to resolve above technical problems, there is provided a method for processing DNS behavior in an embodiment of the disclosure. FIG. 1 illustrates a flowchart of a method for processing DNS behavior according to an embodiment of the disclosure. With reference to FIG. 1, the method for processing DNS behavior may comprise at least Step S102-Step S108.

Step S102, resolving a received network data packet.

Step S104, judging a DNS behavior type corresponding to the network data packet according to the resolution result.

Step S106, determining a processing body according to the DNS behavior type, wherein the processing body comprises a kernel and/or an application layer.

Step S108, transferring the network data packet to the determined processing body, and processing the network data packet by the determined processing body.

In this embodiment of the disclosure, for each of received network data packet, the DNS behavior type corresponding to the network data packet may be judged and the processing body that can process the network data packet may be determined according to the determined DNS behavior type, so as to transfer the network data packet to the determined processing body for processing. In this embodiment of the disclosure, the processing body may be formed of two layers which are a kernel layer and an application layer, respectively. The kernel layer may include a network layer and a driver layer, for example, which can achieve the caching and the protection against attacks; the application layer may provide basic resolution to the network data packet, including address after the domain name resolution and acquisition of data memory address, for example. Compared to the method for processing DNS behavior in the prior art, the network data packet can be transferred to the kernel layer and the application layer for processing, respectively, such that a DNS request can be processed according to the actual request. In the case of millions of DNS request attacks per second, the kernel having a stronger processing capacity can be used to process them; in the case of a DNS request having a lower time-based requirement, the application layer can be used to process them. The kernel layer and the application layer are used to process the DNS request, respectively, in consideration of the kernel having a remarkable processing capacity which can complete the mass-flow DNS queries. Further, when the modification or the starting caused by the DNS request results in loading, one of the kernel layer and the application layer may be used to process the current DNS request while the other one may continue to provide the external services due to respective processes of the kernel layer and the application layer. Therefore, the embodiment of the disclosure can improve the service processing capability of a single machine, achieving rapid dynamic management of domain name and configuration while significantly increasing processing capacity and security defense capability of the system. Therefore, a plenty of customized complex functional requirements can be realized.

At Step S106, it is mentioned that the processing body is determined according to the DNS behavior type. In particular, when the DNS behavior type is an attack behavior, then it is possible to determine the processing body to be the kernel. When the DNS behavior type is a domain name resolution behavior, it is possible to determine the processing body to be the application layer. In order to increase a response speed of domain name resolution service, the processing capability and the security defense capability, according to DNS resolution principle, the caching and the security defense can be completed in the kernel module. Normally, the kernel module can efficiently and stably process 98% of the resolution requests and most of attack protections. Then the basic resolution and the management function the processing logic of which are relative complex and the performance requirement of which are not very high can be realized in the application layer.

Therefore, when the processing body is the kernel, the kernel may detect the network data packet, filter DNS attack behavior carried in the network data packet and transfer the filtered network data packet to the application layer for processing. When the kernel detects the network data packet, it is possible to initiate a DDOS attack resistance strategy, a IP speed-limit strategy and a domain name speed-limit strategy, for example. Accordingly, an individual internal module can be provided for each strategy in the kernel to achieve various strategies.

It should be explained herein that each of network data packet may be provided with a feature code which is unique. Therefore, a property of DNS request of the network data packet can be judged according to the feature code to see through a DNS attack operation pretended to be a normal data packet. Following steps may be used to judge whether the DNS attack behavior is carried in the network data packet.

Step A, calculating a feature code of the network data packet.

Step B, judging whether the feature code is a feature code of DNS attack behavior, wherein if yes, going to Step C, and otherwise, going to Step D.

Step C, if yes, then determining that the DNS attack behavior is carried in the network data packet.

Step D, if not, then determining that the DNS attack behavior is not carried in the network data packet.

Herein, the database normally stores a set of feature codes of known DNS attack behaviors. When verification is required, the feature code calculated at Step A is matched with the set in the database. If the feature code calculated at Step A exists in the set, then the feature code is a DNS attack behavior; otherwise it is not a DNS attack behavior.

Herein, the feature code can be determined according to domain name information such as IP or domain name. For example, the feature code can be obtain by calculating a number of received network data packets from one IP within a designated period and/or by calculating a number of received network data packets from one domain name within a designated period. If the number of network data packets from one IP or one domain name within one second is greatly more than a desirable number of received pockets, the IP address or domain name may be proved to be an attack source. This is also the principle of the IP speed-limit strategy and domain name speed-limit strategy. For the IP address or domain name that has been proved to be the attack source, when the network data packets from the source are received again, they could be directly discarded or filtered, avoiding their attacks and improving the security of system and the processing efficiency.

After the kernel filters the attack behaviors, the network data packets are transferred to the application layer for processing. The application layer may resolve the network data packets, obtain the address information corresponding to the domain name and then feed the obtained relevant data back to a client. Further, the application layer may manage data such as the domain name information and achieve a data management function.

Due to a hierarchical relation and a distributed structure of the DNS domain name system, each level of node in a hierarchical space may store an authorization information record of a next level of a relevant node. In the course of layer-by-layer resolution, the local DNS may visit nodes of all levels in the domain name space. A safe DNS (for example, commonly used 360 safe DNS) may backup the authorization records of the node information. According the mutual relation of records, a backup domain name hierarchical space referred to as "authorization information database" or "authorization database" can be formed. The authorization database corresponds to each level of the domain name and the data information is updated in real time. Therefore, the "authorization information database"

becomes a mirror of Internet domain name level. Since the database has all the authorization information records, when failure occurs in a service at a root node or even any level of domain name node, an authorized resolution service can be made in place of this level of the service.

After the domain name authorization information database has been established, it is possible to initiate a virtual root node service according to the data, externally providing resolution service and other top-level domain authorized disaster-backup service like the root node. The virtual root node employs a distributed deployment, which provide the external services through a BGP Anycast mode. It is possible to reduce DNS failure of single point and improve the capacity of defending DNS attacks, while configuring the virtual root node with an access authority control and shielding the DNS attack data. When abnormity of resolution takes place, the normal response of domestic local DNS can be preferentially ensured.

In particular, when a DNS server fails and cannot be repaired in time, the DNS of a user can be repaired onto a resolvable safe DNS, so as to ensure that the user on network can use the network. Further, after the failure of the DNS server is repaired, the DNS configuration of the user can be restored onto the DNS server.

In this embodiment of the disclosure, the network data packets can be processed in the combination of the kernel and the application layer. If the user needs to modify the DNS (for example, the configuration of the domain name resolution system), the attack behavior can be processed by the kernel with a high speed, while the application layer can take the DNS modification into effect. Their respective processing is independent in such a manner that the DNS modification can be taken into effect in real time.

Figure 2:
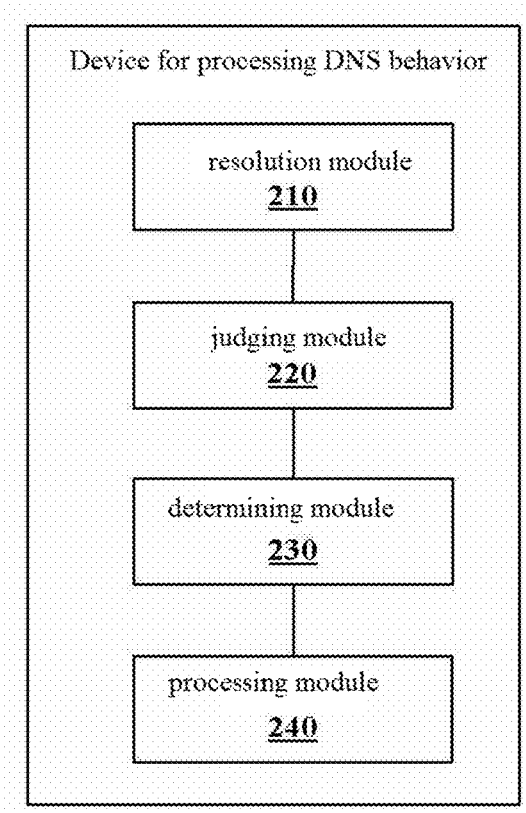
FIG. 2 illustrates a schematic block diagram of a device for processing DNS behavior according to an embodiment of the disclosure.

Based on the same inventive concept, an embodiment of the disclosure provides a device for processing DNS behavior. FIG. 2 illustrates a schematic block diagram of a device for processing DNS behavior according to an embodiment of the disclosure. With reference to FIG. 2, the device may at least include:

a resolution module 210, configured to resolve a received network data packet;

a judging module 220, coupled to the resolution module 210 and configured to judge a DNS behavior type corresponding to the network data packet according to the resolution result;

a determining module 230, coupled to the judging module 220 and configured to determine a processing body according to the DNS behavior type, wherein the processing body comprises a kernel and/or application layer; and a processing module 240, coupled to the determining module 230 and configured to transfer the network data packet to the determined processing body to process the network data packet by the determined processing body.

In a preferred embodiment, the determining module 230 may be further configured to:

when the DNS behavior type is an attack behavior, determine the processing body to be kernel; and when the DNS behavior type is a domain name resolution behavior, determine the processing body to be the application layer.

In a preferred embodiment, the judging module 220 may be further configured to judge that the DNS attack behavior is carried in the network data packet according to following steps:

calculating a feature code of the network data packet;

judging whether the feature code is a feature code of DNS attack behavior;

if yes, then determining that the DNS attack behavior is carried in the network data packet; and if not, then determining that the DNS attack behavior is not carried in the network data packet.

In a preferred embodiment, the feature code comprises:

a number of received network data packet from one IP within a designated period; and a number of received network data packet from one domain name within a designated period.

Figure 3:
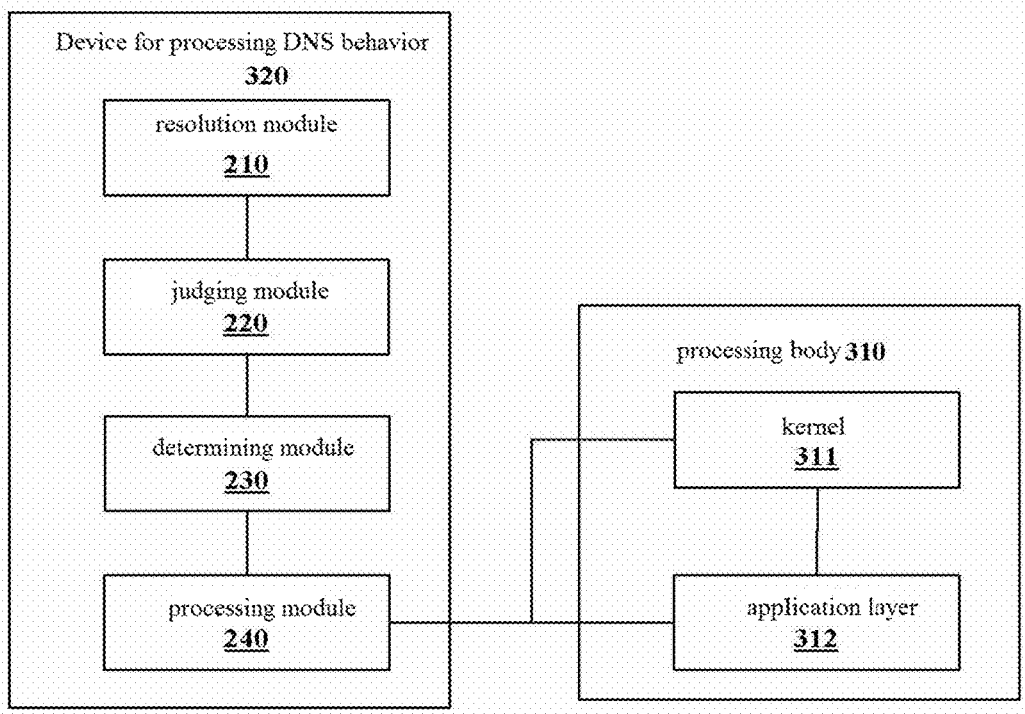
FIG. 3 illustrates a schematic block diagram of a system for processing DNS behavior according to an embodiment of the disclosure.

Based on the same inventive concept, an embodiment of the disclosure provides a system for processing DNS behavior. FIG. 3 illustrates a schematic block diagram of a system for processing DNS behavior according to an embodiment of the disclosure. With reference to FIG. 3, the system may at least comprise the device 320 for processing DNS behavior as shown in FIG. 2 and may further include:

a processing body 310, including a kernel 311 and/or an application layer 312 and configured to invoke different processing bodies to process the network data packet according to the DNS behavior type of the network data packet.

In a preferred embodiment, when the processing body 310 is the kernel 311, the kernel 311 may detect the network data packet, filter DNS attack behaviors carried in the network data packet and transfer the filtered network data packet to the application layer 312 for processing.

The system for processing DNS behavior according to this embodiment of the disclosure focuses on the system architecture itself to divide the processing body into two layers which are the kernel and the application layer, sufficiently utilizing the processing property of the kernel and the application layer. With the hierarchical two-level architecture module, the processing capacity and the security defense capability of the system can be significantly improved while achieving rapid dynamic management of domain name and configuration and realizing a plenty of customized complex functional requirements.

Figure 4:
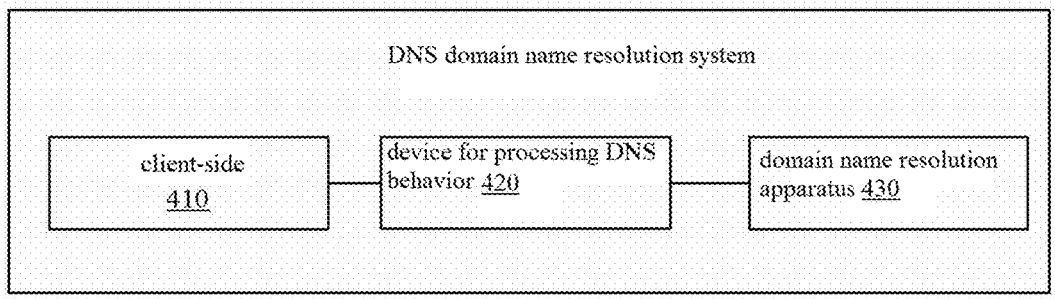
FIG. 4 illustrates a schematic block diagram of a DNS domain name resolution system according to an embodiment of the disclosure.

Based on the method, device and system for processing DNS behavior provided in above preferred embodiments and on the same inventive concept, an embodiment of the disclosure provides a DNS domain name resolution system. FIG. 4 illustrates a schematic block diagram of a DNS domain name resolution system according to an embodiment of the disclosure. With reference to FIG. 4, the DNS domain name resolution system according to the embodiment of the disclosure may at least comprise: a client-side 410, a device 420 for processing DNS behavior and a domain name resolution apparatus 430. It should be explained that, although FIG. 4 illustrates only one client-side 410, in practice the number of client-sides 410 could be an arbitrary integer which is not limited in this embodiment of the disclosure.

Functions of components and connected relation of portions in the DNS domain name resolution system according to this embodiment of the disclosure will be introduced: the client-side 410, configured to send a network data packet;

the device for processing DNS behavior 420, coupled to the client-side 410 and the domain name resolution apparatus 430, respectively, and configured to resolve received network data packet, judge a DNS behavior type corresponding to the network data packet according to the resolution result, determine a processing body according to the DNS behavior type, wherein the processing body comprises a kernel and/or application layer, and transfer the network data packet to the determined processing body to process the network data packet by the determined processing body;

the domain name resolution apparatus 430, coupled to the device for processing DNS behavior 420 and configured to resolve a domain name of the network data packet according to the DNS behavior type.

Figure 5:
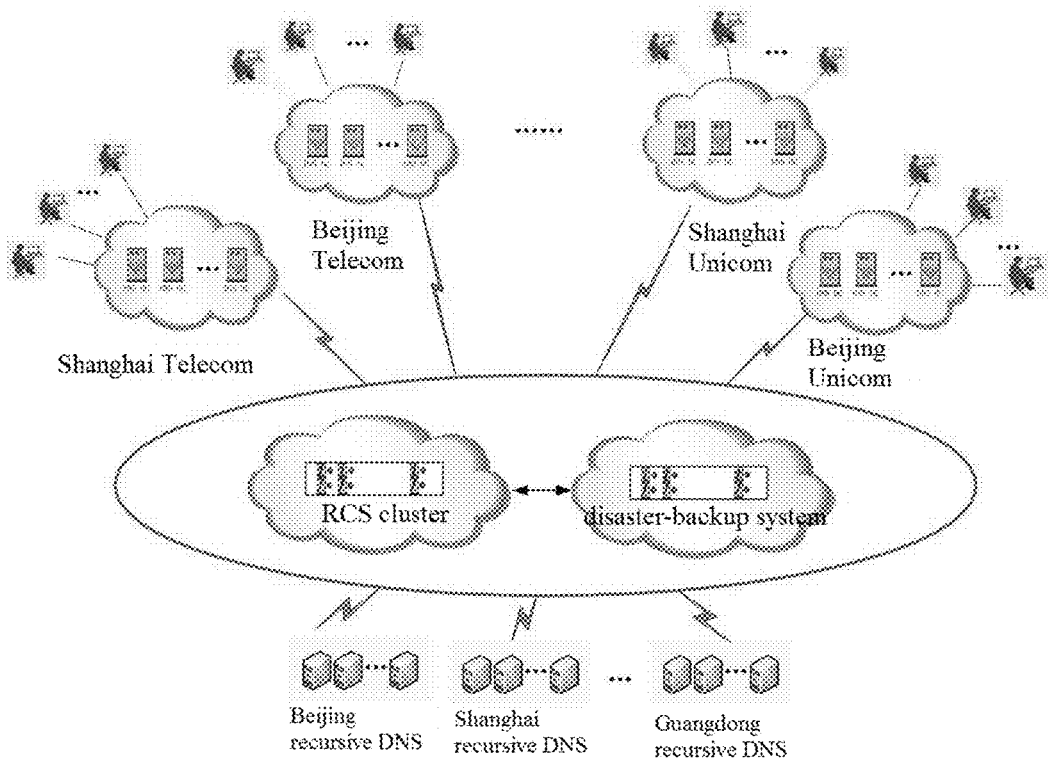
FIG. 5 illustrates an architecture chart of the DNS domain name resolution system according to a preferred embodiment of the disclosure.

FIG. 5 illustrates an architecture chart of the DNS domain name resolution system according to a preferred embodiment of the disclosure. With reference to FIG. 5, users of Shanghai Telecom, Beijing Telecom, Shanghai Unicom and Beijing Unicom send network data packet. For users of Shanghai Telecom, a DNS domain name resolution system thereof is located in a Shanghai Telecom server cluster (cloud-like icons of Shanghai Telecom in FIG. 5). The device for processing DNS behavior in the system may judge the DNS behavior type corresponding to the network data packet, determine the processing body for processing the network data packet according to the determined DNS behavior type, and then allow the processing body to process the network data packet. In a similar way, for users of Beijing Telecom, a DNS domain name resolution system thereof is located in a Beijing Telecom server cluster (cloud-like icons of Beijing Telecom in FIG. 5). The device for processing DNS behavior in the system may perform above operations. For users of Shanghai Unicom, a DNS domain name resolution system thereof is located in a Shanghai Unicom server cluster (cloud-like icons of Shanghai Unicom in FIG. 5). The device for processing DNS behavior in the system may perform above operations. And for users of Beijing Unicom, a DNS domain name resolution system thereof is located in a Beijing Unicom server cluster (cloud-like icons of Beijing Unicom in FIG. 5). The device for processing DNS behavior in the system may perform above operations.

In this embodiment of the disclosure, the network data packet can be transferred to the kernel layer and the application layer for processing, respectively, such that a DNS request can be processed according to the actual request. In the case of millions of DNS request attacks per second, the kernel having a stronger processing capacity can be used to process them; in the case of a DNS request having a lower time-based requirement, the application layer can be used to process them. Therefore, the use of device for processing DNS behavior in the DNS domain name resolution system as shown in FIG. 5 can improve the resistance of the system to a variety of network attacks with mass flow, enhance the protection against the network attacks and increase the security of the system.

With reference to FIG. 5, the other side of the DNS domain name resolution systems can be connected to a RCS cluster and a disaster-backup system and further connected to recursive DNSs via the RCS cluster and the disaster-backup system. Herein, the recursive DNSs can be divided into Beijing recursive DNS, Shanghai recursive DNS, Guangdong recursive DNS, etc., by regions.

With the method, device and system according to the embodiment of the disclosure, following beneficial effects can be achieved:

In this embodiment of the disclosure, for each of received network data packet, the DNS behavior type corresponding to the network data packet may be judged and the processing body that can process the network data packet may be determined according to the determined DNS behavior type, so as to transfer the network data packet to the determined processing body for processing. In this embodiment of the disclosure, the processing body may be formed of two layers which are a kernel layer and an application layer, respectively. The kernel layer may include a network layer and a driver layer, for example, which can achieve the caching and the protection against attacks; the application layer may provide basic resolution to the network data packet, including address after the domain name resolution and acquisition of data memory address, for example. Compared to the method for processing DNS behavior in the prior art, the network data packet can be transferred to the kernel layer and the application layer for processing, respectively, such that a DNS request can be processed according to the actual request. In the case of millions of DNS request attacks per second, the kernel having a stronger processing capacity can be used to process them; in the case of a DNS request having a lower time-based requirement, the application layer can be used to process them. The kernel layer and the application layer are used to process the DNS request, respectively, in consideration of the kernel having a remarkable processing capacity which can complete the mass-flow DNS queries. Further, when the modification or the starting caused by the DNS request results in loading, one of the kernel layer and the application layer may be used to process the current DNS request while the other one may continue to provide the external services due to respective processes of the kernel layer and the application layer. Therefore, the embodiment of the disclosure can improve the service processing capability of a single machine, achieving rapid dynamic management of domain name and configuration while significantly increasing processing capacity and security defense capability of the system. Therefore, a plenty of customized complex functional requirements can be realized.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

Similarly, it should be understood that, in order to simplify the disclosure and to facilitate the understanding of one or more of various aspects thereof, in the above description of the exemplary embodiments of the disclosure, various features of the disclosure may sometimes be grouped together into a single embodiment, accompanying figure or description thereof. However, the method of this disclosure should not be constructed as follows: the disclosure for which the protection is sought claims more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the disclosure.

It should be understood by those skilled in the art that modules of the apparatus in the embodiments can be adaptively modified and arranged in one or more apparatuses different from the embodiment. Modules in the embodiment can be combined into one module, unit or component, and also can be divided into more sub-modules, sub-units or sub-components. Except that at least some of features and/or processes or modules are mutually exclusive, various combinations can be used to combine all the features disclosed in specification (including appended claims, abstract and accompanying figures) and all the processes or units of any methods or devices as disclosed herein. Unless otherwise definitely stated, each of features disclosed in specification (including appended claims, abstract and accompanying figures) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the disclosure and forms the different embodiment. For example, in the appended claims, any one of the embodiments for which the protection is sought can be used in any combined manners.

Each of components according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the components in the devices for loading recommendation information, detecting web address and loading recommendation information of search result according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the Internet websites, or be provided in carrier, or be provided in other manners.

Figure 6:
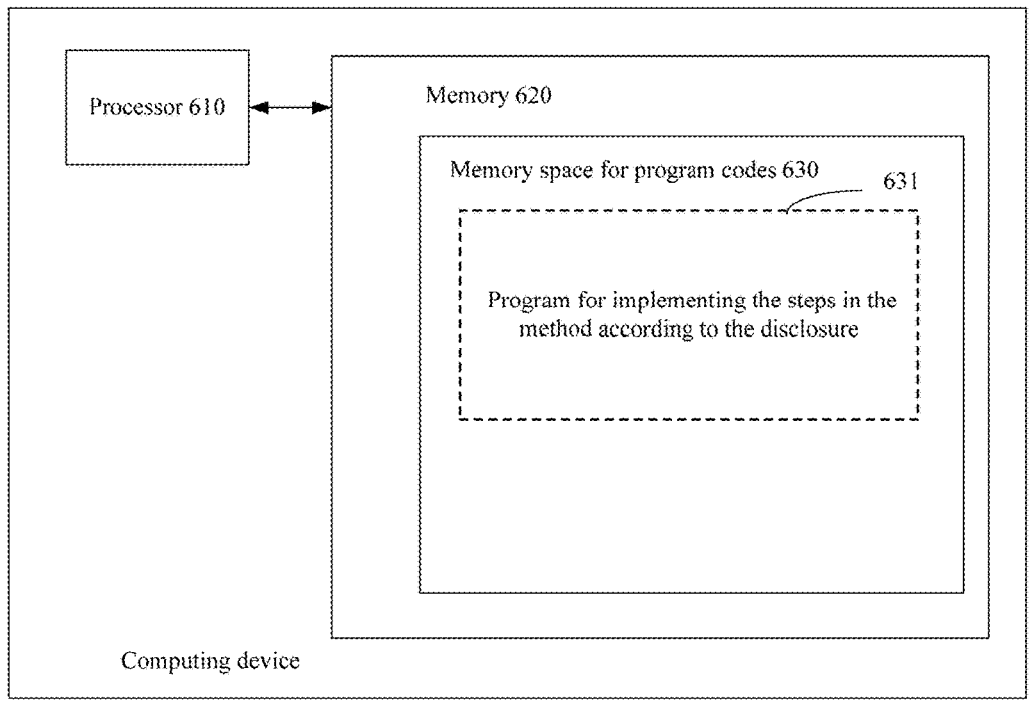
FIG. 6 schematically illustrates a block diagram of a computing device for carrying out the method for processing DNS behavior according to the disclosure.
Figure 7:
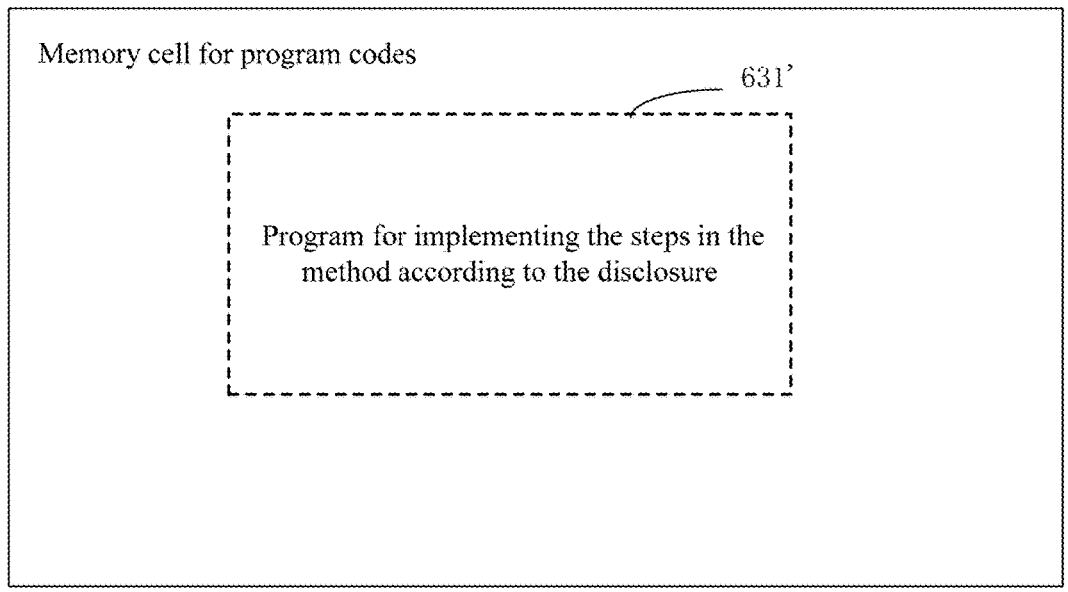
FIG. 7 schematically illustrates a memory cell which is used to store or carry program codes for realizing the methods for processing DNS behavior according to the disclosure.

For example, FIG. 6 illustrates a computing device which may implement the method for processing DNS behavior according to this disclosure, such as an application server. Traditionally, the computing device includes a processor 610 and a computer program product or a computer readable medium in the form of a memory 620. The memory 620 could be electronic memories such as flash memory, EEPROM (Electrically Erasable Programmable Read-Only Memory), EPROM, hard disk or ROM. The memory 620 has a memory space 630 for executing program codes 631 of any steps in the above methods. For example, the memory space 630 for program codes may include program codes 631 for implementing the respective steps in the method as mentioned above. These program codes may be read from or be written into one or more computer program products. These computer program products include program code carriers such as hard disk, compact disk (CD), memory card or floppy disk. These computer program products are usually the portable or stable memory cells as shown in reference FIG. 7. The memory cells may be provided with memory sections, memory spaces, etc., similar to the memory 620 of the electronic device as shown in FIG. 6. The program codes may be compressed for example in an appropriate form. Usually, the memory cell includes computer readable codes 631' which could be readable for example by the processor 610. When these codes are operated on the computing device, the computing device may execute respective steps in the method as described above.

The "an embodiment", "embodiments" or "one or more embodiments" mentioned in the disclosure means that the specific features, structures or performances described in combination with the embodiment(s) would be included in at least one embodiment of the disclosure. Moreover, it should be noted that, the wording "in an embodiment" herein may not necessarily refer to the same embodiment.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

Also, it should be noticed that the language used in the present specification is chosen for the purpose of readability and teaching, rather than explaining or defining the subject matter of the disclosure. Therefore, it is obvious for an ordinary skilled person in the art that modifications and variations could be made without departing from the scope and spirit of the claims as appended. For the scope of the disclosure, the publication of the inventive disclosure is illustrative rather than restrictive, and the scope of the disclosure is defined by the appended claims.

What is claimed is:

1. A method for processing Domain Name System (DNS) behavior, comprising:
   parsing a received network data packet;
   determining a DNS behavior type corresponding to the network data packet according to a parse result;
   determining a processing body according to the DNS behavior type, wherein the processing body comprises at least one of a kernel and an application layer;
   transferring the network data packet to the determined processing body;
   processing the network data packet by the determined processing body, wherein the processing the network data packet by the determined processing body further comprises: when the determined processing body is the kernel,
      detecting the network data packet and filtering a DNS attack behavior carried in the network data packet by the kernel, and
      transferring the filtered network data packet to the application layer for processing;
   wherein the method further comprises following steps to determine that the DNS attack behavior is carried in the network data packet:
   calculating a feature code of the network data packet;
   judging whether the feature code is a feature code of the DNS attack behavior;
   if yes, then determining that the DNS attack behavior is carried in the network data packet; and
   if not, then determining that the DNS attack behavior is not carried in the network data packet.

2. The method according to claim 1, wherein the step of determining a processing body according to the DNS behavior type, comprises:
   when the DNS behavior type is an attack behavior, determining the processing body to be the kernel; and
   when the DNS behavior type is a domain name resolution behavior, determining the processing body to be the application layer.

3. The method according to claim 1, wherein the feature code comprises:
   a number of received network data packets from one IP within a designated period; and
   a number of received network data packets from one domain name within a designated period.

4. The method according to claim 1, wherein after the transferring the filtered network data packet to the application layer for processing, the method further comprises:
when a root node or other corresponding domain name resolution is abnormal, constructing a virtual root system by an authorization database through a BGP Anycast mode, and guiding all visits to a root domain name server to a virtual root domain node server to externally provide DNS resolution services.

5. The method according to claim 4, wherein when a DNS server fails and is unable to be repaired in time, the DNS of a user is repaired onto a resolvable safe DNS, so as to ensure that the user on network is able to use the network; and
after the failure of the DNS server is repaired, the DNS configuration of the user is restored onto the DNS server.

6. A computing device, comprising:
a memory having instructions stored thereon;
a processor configured to execute the instructions to perform operations for processing Domain Name System (DNS) behavior, the operations comprising:
parsing a received network data packet;
determining a DNS behavior type corresponding to the network data packet according to a parse result;
determining a processing body according to the DNS behavior type, wherein the processing body comprises at least one of a kernel and an application layer;
transferring the network data packet to the determined processing body;
processing the network data packet by the determined processing body;
wherein the processor is further configured to execute instructions to perform following operations so as to determine that a DNS attack behavior is carried in the network data packet:
calculating a feature code of the network data packet;
judging whether the feature code is a feature code of the DNS attack behavior;
if yes, then determining that the DNS attack behavior is carried in the network data packet; and
if not, then determining that the DNS attack behavior is not carried in the network data packet.

7. The computing device according claim 6, wherein the determining a processing body according to the DNS behavior type further comprises:
when the DNS behavior type is an attack behavior, determining the processing body to be kernel; and
when the DNS behavior type is a domain name resolution behavior, determining the processing body to be the application layer.

8. The computing device according claim 7, wherein the feature code comprises:
a number of received network data packets from one IP within a designated period; and
a number of received network data packets from one domain name within a designated period.

9. A non-transitory computer readable medium having computer programs stored thereon that, when executed by one or more processors of a computing device, cause the computing device to perform:
parsing a received network data packet;
determining a Domain Name System (DNS) behavior type corresponding to the network data packet according to a parse result;
determining a processing body according to the DNS behavior type, wherein the processing body comprises at least one of a kernel and an application layer;
transferring the network data packet to the determined processing body;
processing the network data packet by the determined processing body, wherein the processing the network data packet by the determined processing body further comprises: when the determined processing body is the kernel,
detecting the network data packet and filtering a DNS attack behavior carried in the network data packet by the kernel, and
transferring the filtered network data packet to the application layer for processing;
wherein the non-transitory computer readable medium further comprises computer programs stored thereon that, when executed by one or more processors of a computing device, cause the computing device to perform following steps to determine that the DNS attack behavior is carried in the network data packet:
calculating a feature code of the network data packet;
judging whether the feature code is a feature code of the DNS attack behavior;
if yes, then determining that the DNS attack behavior is carried in the network data packet; and
if not, then determining that the DNS attack behavior is not carried in the network data packet.

10. The non-transitory computer readable medium according to claim 9, wherein the determining a processing body according to the DNS behavior type, comprises:
when the DNS behavior type is an attack behavior, determining the processing body to be the kernel; and
when the DNS behavior type is a domain name resolution behavior, determining the processing body to be the application layer.

11. The non-transitory computer readable medium according to claim 9, wherein the feature code comprises:
a number of received network data packets from one IP within a designated period; and
a number of received network data packets from one domain name within a designated period.

12. The non-transitory computer readable medium according to claim 9, wherein after the transferring the filtered network data packet to the application layer for processing, the computing device is further caused to perform:
when a root node or other corresponding domain name resolution is abnormal, constructing a virtual root system by an authorization database through a BGP Anycast mode, and guiding all visits to a root domain name server to a virtual root domain node server to externally provide DNS resolution services.

13. The non-transitory computer readable medium according to claim 12, wherein when a DNS server fails and is unable to be repaired in time, the DNS of a user is repaired onto a resolvable safe DNS, so as to ensure that the user on network is able to use the network; and
after the failure of the DNS server is repaired, the DNS configuration of the user is restored onto the DNS server.

* * * * *